US007098431B2

(12) United States Patent
Chia Salido et al.

(10) Patent No.: US 7,098,431 B2
(45) Date of Patent: Aug. 29, 2006

(54) STERILE FEEDING BOTTLE

(76) Inventors: Yolanda Chia Salido, Avda. Machupichu, 11, Madrid (ES); Abraham Esteva Garcia, Avda. Machupichu, 11, Madrid (ES)

( * ) Notice: Subject to any disclaimer, the term of this patent is extended or adjusted under 35 U.S.C. 154(b) by 0 days.

(21) Appl. No.: 10/974,985

(22) Filed: Oct. 27, 2004

(65) Prior Publication Data

US 2005/0183587 A1 Aug. 25, 2005

(30) Foreign Application Priority Data

Oct. 27, 2003 (ES) ................................ 200302428

(51) Int. Cl.
*H05B 6/80* (2006.01)
*A23C 3/07* (2006.01)

(52) U.S. Cl. ........................................ 219/725; 99/451

(58) Field of Classification Search ................ 219/725, 219/678; 99/451; 229/902, 903, 906.1; 215/316, 318
See application file for complete search history.

(56) References Cited

U.S. PATENT DOCUMENTS 3,439,510 A * 4/1969 Gray ............................ 62/78
3,494,723 A * 2/1970 Gray ........................... 422/21
3,494,724 A * 2/1970 Gray ........................... 422/21
4,877,624 A * 10/1989 Floyd et al. ................ 426/241
5,108,701 A * 4/1992 Zakaria et al. ................ 422/21
5,180,896 A * 1/1993 Gibby et al. ................ 219/687
5,320,804 A * 6/1994 Zakaria et al. ................ 422/21
5,334,402 A * 8/1994 Ovadia ....................... 426/241
5,447,247 A * 9/1995 Derksen ..................... 215/247
6,045,254 A * 4/2000 Inbar et al. ................. 366/130
6,505,622 B1 * 1/2003 Py ........................ 128/203.18
6,622,864 B1 * 9/2003 Debbs et al. ............... 206/438

* cited by examiner

*Primary Examiner*—Daniel L. Robinson
(74) *Attorney, Agent, or Firm*—Collard & Roe

(57) ABSTRACT

The present invention relates to a sterile feeding bottle which is manufactured in disposable plastic and/or rubber materials, resistant to heat, including that produced by microwaves, and which has the special feature of incorporating a solute and a solvent which are separate from each other but which can be mixed by simple and novel means which are incorporated in the feeding bottle, for the preparation of a compound, and without coming into contact with any of the components, or any of the elements of the feeding bottle itself, including the teat.

5 Claims, 5 Drawing Sheets

STERILE FEEDING BOTTLE

CROSS REFERENCE TO RELATED APPLICATIONS

Applicants claim priority under 35 U.S.C. §119 of Spanish Application No. 200302428 filed Oct. 27, 2003.

OBJECT OF THE INVENTION

The present invention relates to a sterile feeding bottle which is manufactured in disposable plastic and/or rubber materials, resistant to heat, including that produced by microwaves, and which has the special feature of incorporating a solute and a solvent which are separate from each other but which can be mixed by simple and novel means which are incorporated in the feeding bottle, for the preparation of a compound, and without coming into contact with any of the components, or any of the elements of the feeding bottle itself, including the teat.

The object of the invention is to produce a feeding bottle that is used only once and which is simple, easy, quick and convenient to use, and which at any time and place and in any situation, can be used to prepare and administer a ready-made, sterile compound, without the need to carry the ingredients, components of this compound or feeding bottle, and without the need to have to sterilize them by any chemical or mechanical method, as required traditionally, and without any handling whatsoever, avoiding any possible contamination, all this being done in such a way that, once used, the feeding bottle is thrown away.

BACKGROUND OF THE INVENTION

Feeding bottles that are currently being commercialized and used for administering feed for babies, are not only not disposable, but they also have to be sterilized and subsequently handled during the different stages of preparation before being administered. This is true both in their use in the home and in teaching or health centres, which is obviously detrimental to the health of children as there is a reduced guarantee of sterility with excess handling in each case.

Although disposable feeding bottles are known, their commercialization is for the administration of saline solutions, medicines and other pharmacological substances.

In short, the conventional feeding bottles used for administering formula to unweaned or new-born babies are designed for administering feed which requires a considerable amount of preparation time, as well as numerous and complicated steps for their preparation (washing, sterilizing, measuring, mixing, etc.). And, therefore, in rushed situations, emergencies or where there is uncertainty of having the adequate means, if there is no kitchen available, etc., for example when staying in a hotel, a tent or away from home in general, preparing a feeding bottle can be a real problem.

The inconvenience of each and every one of the above steps mentioned for preparing a feeding bottle and the handling thereof, is worth mentioning here. In both homes and teaching centres, including hospitals, there is a continuous risk to guaranteed hygiene and sterility, which is so important for infants of under one year, and especially for new-born and unweaned babies.

DESCRIPTION OF THE INVENTION

The feeding bottle being the object of the invention has been designed to resolve the aforementioned problems, based on a simple but very effective solution, since it involves a feeding bottle which is used only once, which is sterile and which has a compartment housed inside the body of the feeding bottle, a compartment which contains a precise measure of the solute for mixing with the solvent, itself also precisely measured, and being contained in the body of the feeding bottle.

On top of the opening are two lids which are both sealed, positioned axially in such a way that when one of the lids is turned, the lower part of the compartment containing the solute is opened, thus enabling the solute to fall inside the body of the feeding bottle to mix with the solvent or other contents, while turning of the second lid produces an opening in the upper seal of the solute compartment, so that the inside thereof is opened to the teat, mounted on the upper end, through a neck which is positioned specifically in this upper part and onto which the teat is fitted, together with the upper lid.

In this way, the feeding bottle is prepared without the need for contact with any of the inner components, i.e. without having contact with either the solute or the solvent, or even with the teat, which is already covered with a sealed lid, and the opening of which enables the feeding bottle to be administered or given to the unweaned baby.

Obviously, when the solute is mixed with the solvent it must be shaken to make a uniform mixture, it being possible to heat the compound if necessary, the bottle being thrown away once administered.

The size of the bottle will be that of any other feeding bottle, being easy to store and carry, and long-lasting and, although the solute and solvent will have an expiry date, as long as they do not come into contact with each other, they will also last for an appropriate period of time.

In summary, the feeding bottle disclosed makes preparing a baby's bottle simple, convenient and hygienic, allowing the prepared feed to be administered to the baby without danger of contamination, since everything is sterilized and there has been no contact with any of the components, which have not been handled in any way.

Obviously, both the amount of solute and the amount of solvent will correspond with the exact, suitable doses and conditions to fully guarantee the hygiene required by babies and their feed.

In one variation of embodiment, the feeding bottle may include a second inner compartment, in the opposite end, which will obviously be the lower part of the body of the feeding bottle, to contain another solute for mixing with the earlier preparation, and the second compartment of which will also have a corresponding screw-on lid for the opening thereof.

DESCRIPTION OF THE DRAWINGS

To accompany the description provided and in order to provide a better understanding of the characteristics of the invention, in accordance with a preferred example of practical embodiment thereof, a set of drawings is attached as an integral part of said description, wherein the following is represented in a purely illustrative and non-limitative way.

PREFERRED EMBODIMENT OF THE INVENTION

Figure 1:
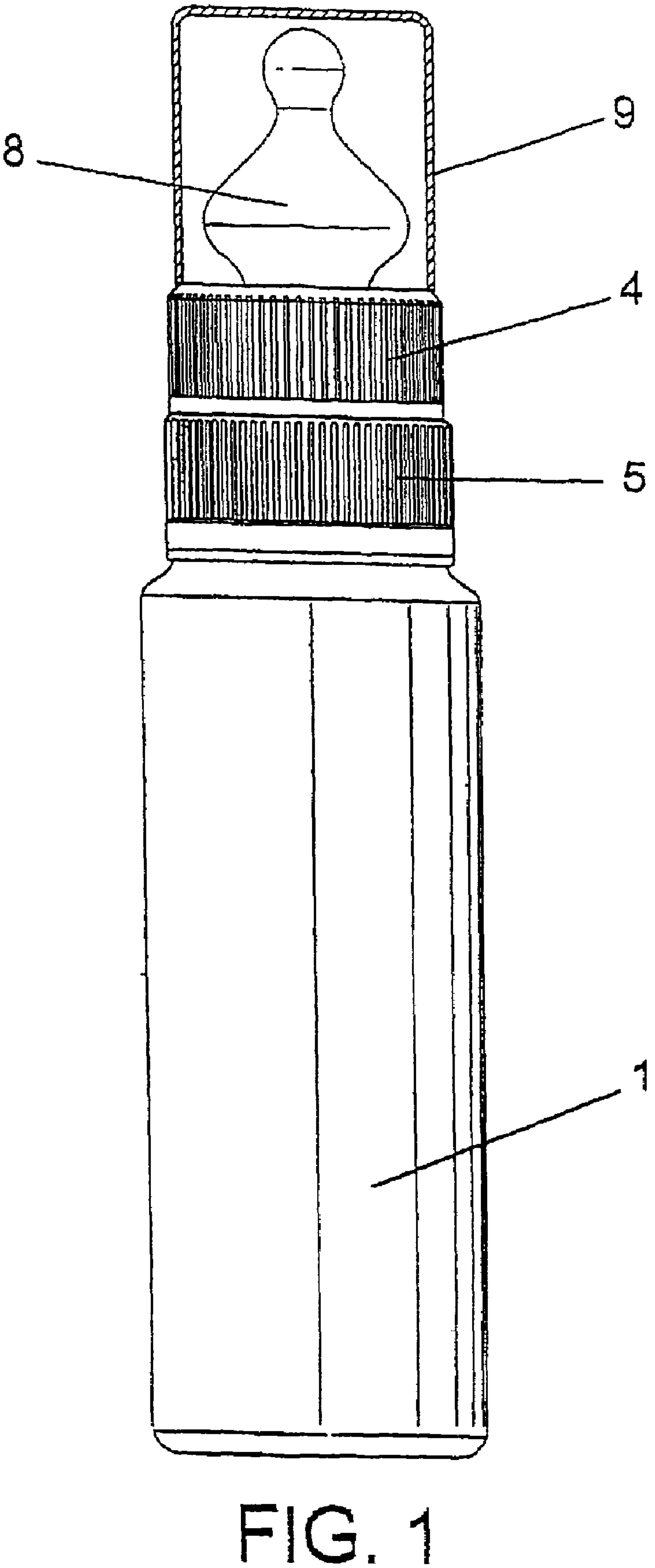
FIG. 1 Shows a side elevational view of the feeding bottle being the object of the invention, wherein the screw-on lids can be seen in an axial position and, in the upper end, is the corresponding teat, covered or protected by a lid as shown by the broken line.
Figure 2:
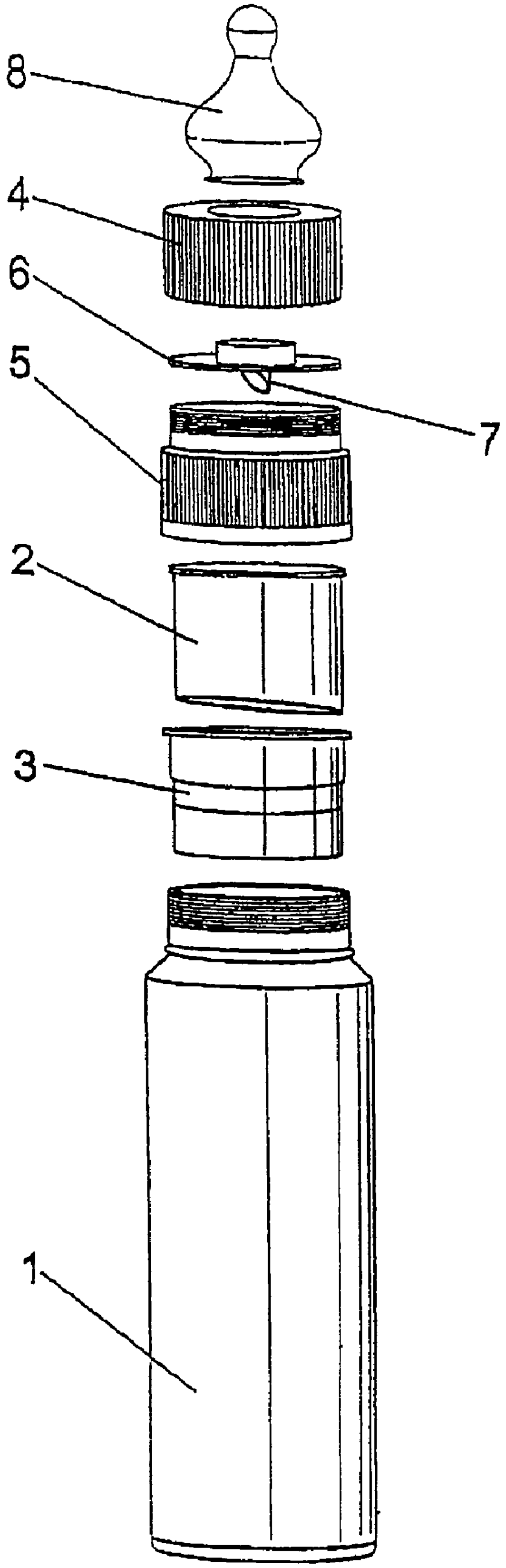
FIG. 2 Shows an exploded view of the feeding bottle in the previous figure.
Figure 3:
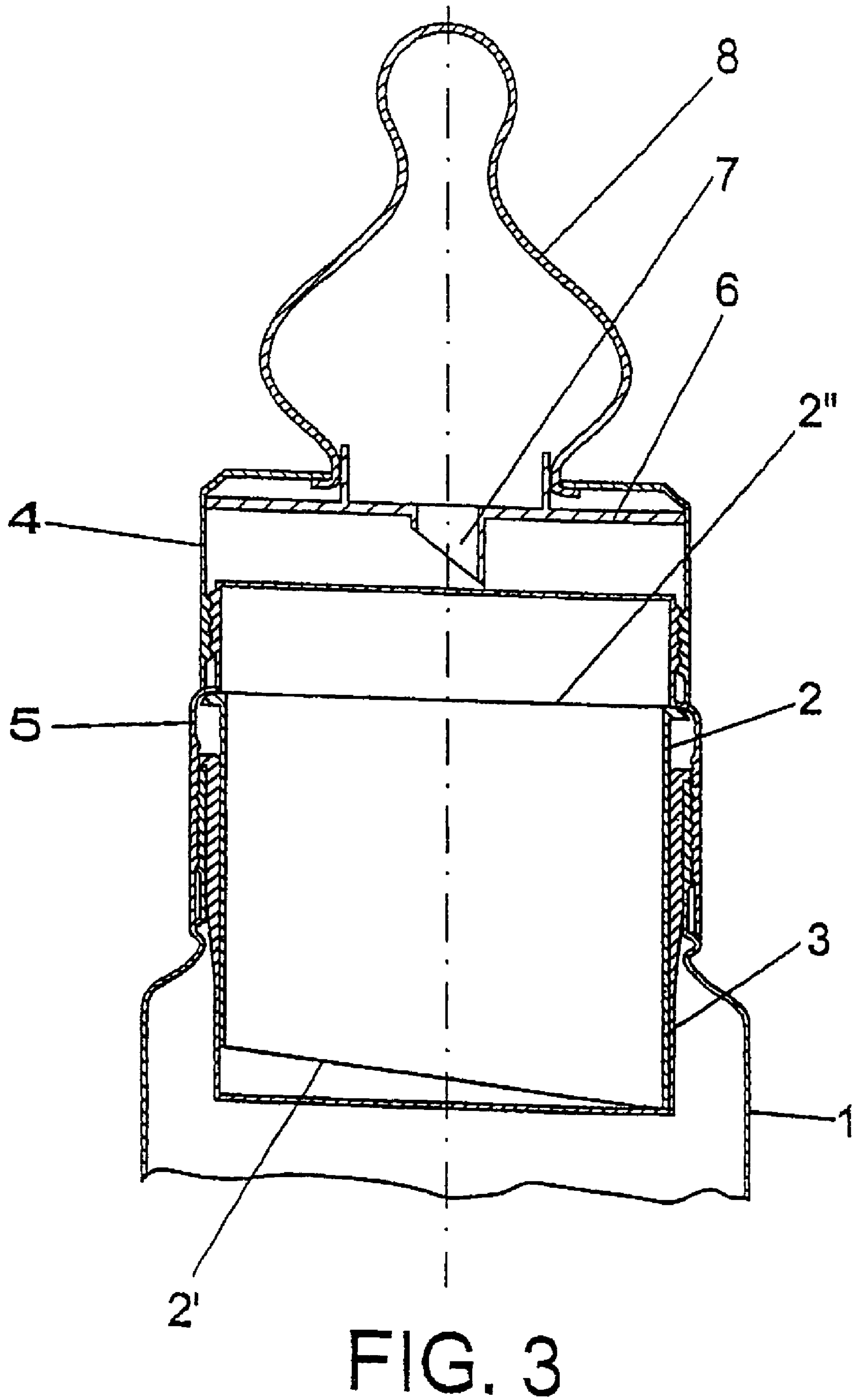
FIG. 3 Shows a cross-section view of the upper part of the feeding bottle in FIG. 1, wherein the compartment containing the solute and the two screw-on lids can be seen, as well as the neck through which the inside of the body of the feeding bottle and the teat, also shown in this figure, will be joined.
Figure 4:
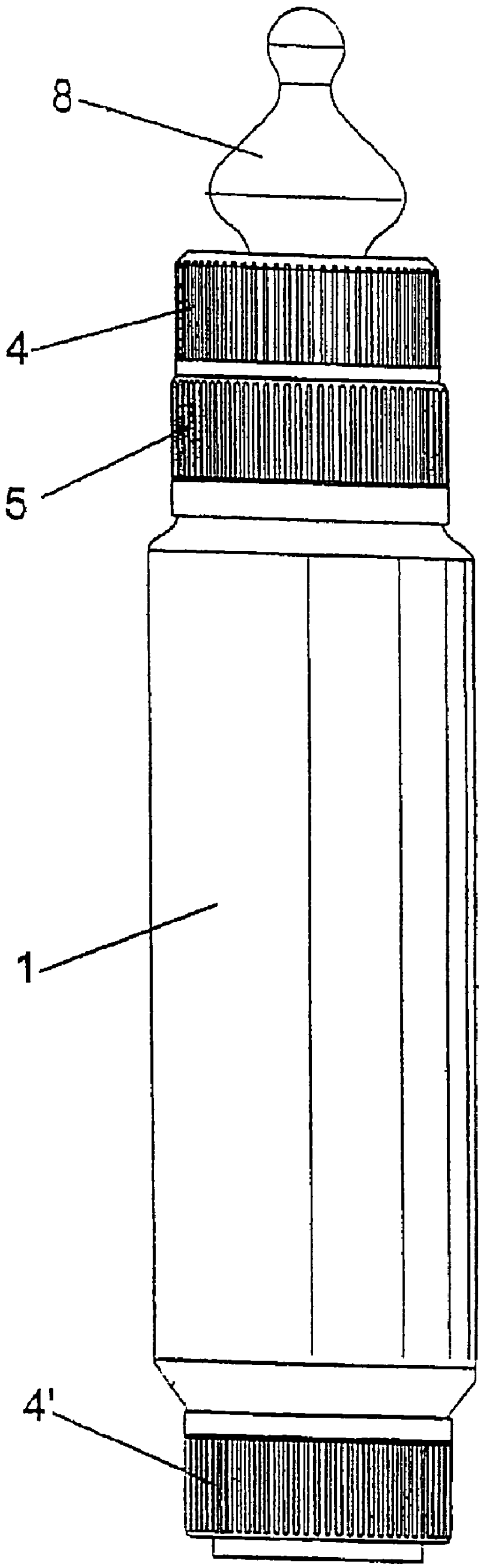
FIG. 4 Shows a side elevational view like that in FIG. 1, but with the feeding bottle incorporating a second compartment for the solute in its lower part, with the corresponding screw-on lid.

Looking at the figures provided, it can be seen how the feeding bottle of the invention is made up of a conventional cylindrical body (1), of a material suitable for resisting high temperatures, including the heat in a microwave. The body (1) of said feeding bottle houses, inside in its upper part, a compartment (2) containing a solute for mixing with a solvent contained in the body itself (1). This compartment or recipient (2) for the solute is situated on top of a neck (3) duly positioned on the inside of the mouth of the body (1) of the feeding bottle.

Two sealed lids (4) and (5) are fitted or mounted on top of this opening, together with a ring (6) with a cylindrical or bevelled portion of neck (7), the corresponding teat (8) being supported between the lid (4) and the circular body (6), the teat being protected by an upper lid which is also sealed (9), since both of said lids (4) and (5) are sealed at the outset.

The feeding bottle made up in this way, is supplied with the solute inside the recipient or compartment (2) and with the solvent inside the body (1) of the bottle, everything being duly sterilized from the time the feeding bottle is manufactured and is suitable for preparing the compound, which will obviously have expiry dates as the feeding bottle is to be used only once.

The feed is mixed first by screwing the lid (5) which opens the lower part (2) of the recipient or compartment (2), the solute falling onto the solvent contained in the body (1), a uniform mixture being produced simply by shaking.

Subsequently, and after screwing the lid (4), the upper seal (2") is perforated and the inside of the body (1) containing the mixed compound is thus joined up with the teat (8) through the passage formed by the tube or neck (7).

Figure 5:
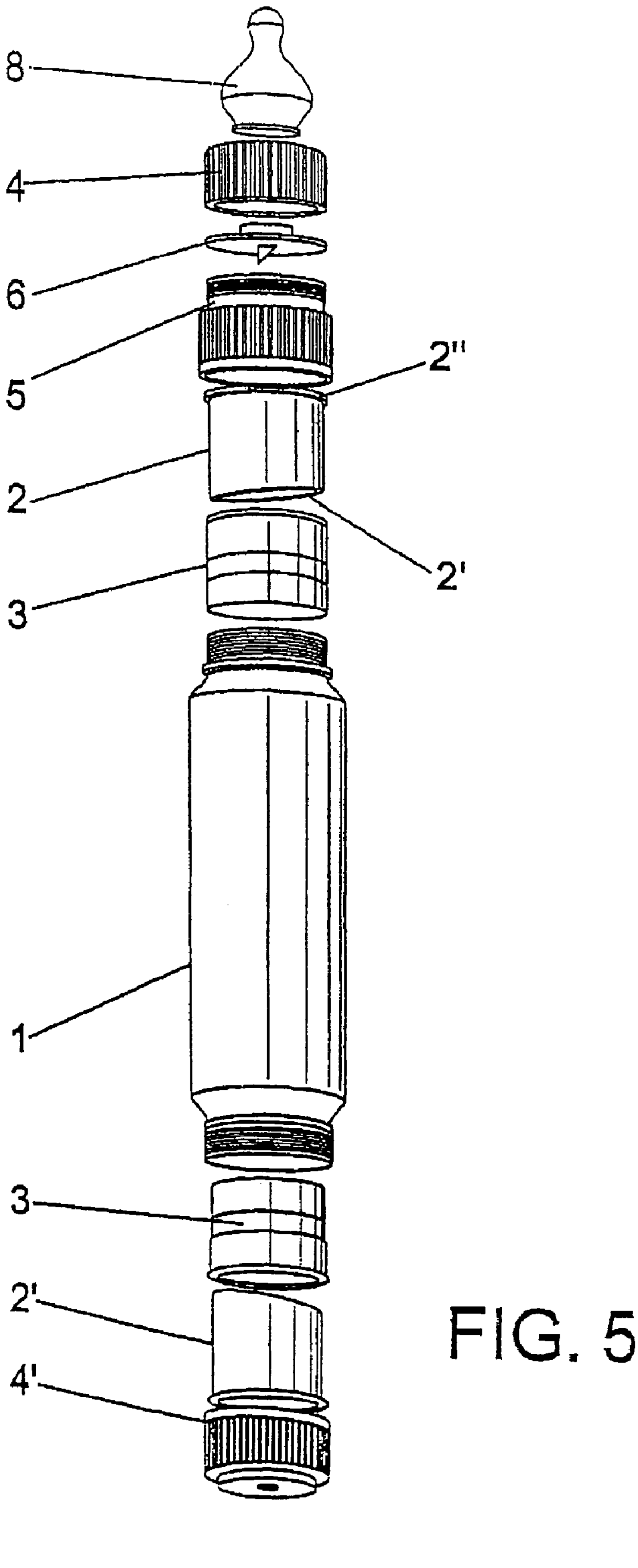
FIG. 5 Shows an exploded view of the feeding bottle in the previous figure.

In one variation of embodiment shown in FIG. 5, it can be seen how the base of the neck of the feeding bottle (1) incorporates a lid (4') which closes the corresponding opening, after which there is a second compartment or recipient (2') identical to the aforementioned one, with the additional neck (3) positioned in the same way inside the body (1) of the feeding bottle, so that via this second compartment (2') a second solute can be mixed with the earlier compound obtained with the solvent and the solute, the recipient or compartment (2') being opened using the lid (4'), in the same way as the compartment (2) was opened using the lid (5) in the upper part or opening of the body of the feeding bottle (1).

The invention claimed is:

1. A sterile feeding bottle, comprising:

(a) a cylindrical, hollow body comprising a material suitable for resisting high temperatures, including that of microwaves, and having an upper end;

(b) a teat mounted axially on the upper end;

(c) a receptacle inside said body comprising an upper part, a base having an opening, and a first sealing lid provided in the opening movable through a screwing action between a sealed position and a mixing position, said receptacle containing a solute for mixing with a solvent contained in said body for preparing a compound, the solute and solvent being separate and ready for mixing through the opening by the screwing action of the first sealing lid; and (d) a rotatable second sealing lid, said second sealing lid upon rotation opening the upper part for connecting the receptacle with an inside portion of said body and with the teat for administering the compound;

wherein the first and second sealing lids are positioned coaxially to one another on the upper part.

2. The sterile feeding bottle, according to claim 1, wherein the body, the solute, the solvent and the teat, are sterilized and are impossible to be handled from time of manufacture to supply of the compound, the feeding bottle being disposable following supply of the compound.

3. The sterile feeding bottle, according to claim 1, wherein the teat is protected and isolated from the outside by a third sealing lid.

4. A sterile feeding bottle, comprising:

(a) a cylindrical, hollow body comprising a material suitable for resisting high temperatures, including that of microwaves, and having an upper end;

(b) a teat mounted axially on the upper end;

(c) a receptacle inside said body comprising an upper part, a base having an opening, and a first sealing lid provided in the opening movable through a screwing action between a sealed position and a mixing position, said receptacle containing a solute for mixing with a solvent contained in said body for preparing a compound, the solute and solvent being separate and ready for mixing through the opening by the screwing action of the first sealing lid; and (d) a rotatable second sealing lid, said second sealing lid upon rotation opening the upper part for connecting the receptacle with an inside portion of said body and with the teat for administering the compound;

wherein the teat is supported between the first sealing lid and a discoidal part located on an inside part of said first sealing, said discoidal part having a small, cylindrical neck with bevelling inside through which the compound are supplied to the teat once the solute and solvent have been mixed.

5. A sterile feeding bottle, comprising:

(a) a cylindrical, hollow body comprising a material suitable for resisting high temperatures, including that of microwaves, and having an upper end and an openable lower base;

(b) a teat mounted axially on the upper end;

(c) a first receptacle inside said body comprising an upper part, a base having a first opening, and a first sealing lid provided in the first opening movable through a screwing action between a sealed position and a mixing position, said first receptacle containing a first solute for mixing with a solvent contained in said body for preparing a first compound, the first solute and solvent being separate and ready for mixing through the opening by the screwing action of the first sealing lid;

(d) a second receptacle inside said body comprising an inner base having a second opening and a second lid screwed onto said inner base for closing said second opening, said second receptacle containing a second solute for mixing with the first compound to form a second compound by opening said second lid; and (e) a rotatable third sealing lid, said third sealing lid upon rotation opening the upper part for connecting the first receptacle with an inside portion of said body and with the teat for administering the second compound.

* * * * *